United States Patent [19]
Li et al.

[11] Patent Number: 5,807,412
[45] Date of Patent: Sep. 15, 1998

[54] ELECTROCHEMICAL CELL HAVING A POLYMER ELECTROLYTE

[76] Inventors: Changming Li, 135 Royal Oak Dr., Vernon Hills, Ill. 60061; Ke Keryn Lian, 2100 Valencia Dr., No. 116B, Northbrook, Ill. 60062; Richard H. Jung, 1016 N. Knight, Park Ridge, Ill. 60068

[21] Appl. No.: 865,619

[22] Filed: May 30, 1997

Related U.S. Application Data

[62] Division of Ser. No. 693,780, Jul. 22, 1996, Pat. No. 5,693,434.

[51] Int. Cl.$^6$ ................................. H01M 10/40
[52] U.S. Cl. ..................... 29/623.5; 429/192; 429/30; 429/33
[58] Field of Search ................... 429/192, 30, 33, 429/623.5

[56] References Cited

U.S. PATENT DOCUMENTS

| | | | |
|---|---|---|---|
| 4,269,913 | 5/1981 | Lim et al. | 429/251 |
| 5,099,039 | 3/1992 | Schiraldi et al. | 549/509 |
| 5,368,614 | 11/1994 | Lim | 29/623.5 |
| 5,525,436 | 6/1996 | Savinell et al. | 429/30 |
| 5,541,019 | 7/1996 | Anani et al. | 429/59 |
| 5,599,639 | 2/1997 | Sansone et al. | 429/33 |
| 5,654,113 | 8/1997 | Vaidyanathan et al. | 429/192 |

FOREIGN PATENT DOCUMENTS

| | | | |
|---|---|---|---|
| 0078404A2 | 3/1982 | European Pat. Off. | H01M 14/00 |
| 0115 525 B1 | 9/1983 | European Pat. Off. | H01M 10/34 |

OTHER PUBLICATIONS

Polybenzimidazoles, vol. 11, pp. 572–601, Encyclopaedia of Polymer Science & Engineering, Wiley Interscience, ISBM 0–471–80944–6 (No month available), 1985.

Publication entitled History and Development of Polybenzimidazole, Powers, et al, PBI Products Division, Hoechst Celanese; Symposium on the Istory of High Performance Polymers, ACS, 1986 (no month available).

Heterocyclic Polymers, *Thermally Stable Polymers,* ISBN 0–8247–6969–4, Patrick Cassidy, 1980. (no month available.

*Primary Examiner*—Stephen Kalafut
*Assistant Examiner*—Carol Chaney
*Attorney, Agent, or Firm*—Felipe J. Farley

[57] ABSTRACT

An electrochemical cell is provided with first (10) and second (11) electrodes and a solid polymer electrolyte (15) disposed therebetween. The solid polymer electrolyte is preferably fabricated by providing a linear powdered polymeric precursor material which is thereafter heated to temperatures sufficient to drive off moisture and in the presence of an electrolyte active species. The electrolyte active species is preferably an acidic electrolyte active species which has the effect of protonating the powdered polymeric precursor material. Electrochemical cells fabricated using these devices demonstrate performance characteristics far better than those available in the prior art.

11 Claims, 7 Drawing Sheets

FIG. 7

ELECTROCHEMICAL CELL HAVING A POLYMER ELECTROLYTE

This is a divisional application under §1.60 of pending U.S. patent application Ser. No. 08/693,780 filed Jul. 22, 1996 now U.S. Pat. No. 5,693,434 and assigned to Motorola, Inc.

TECHNICAL FIELD

This invention relates in general to electrochemical cells, and more particularly to electrochemical cells having a polymer electrolyte comprising a polymeric matrix or support structure and an electrolyte active species dispersed therein.

BACKGROUND

Energy generation and storage has long been a subject of study and development. Of special importance is the storage of electrical energy in a compact form that can be readily charged and discharged such as rechargeable electrochemical batteries and/or electrochemical capacitors. High power, high current pulse rechargeable electrochemical charge storage devices are also becoming increasingly important in applications in which electrical pulses are demanded of the battery cells. Examples of such devices include digital communication devices, power tools, and portable computers to name but a few. In each of these devices, high electrochemical kinetic rate, long cycle life of the electrode material and good ionic conductivity of the electrolyte are all extremely important considerations.

Most electrochemical cells have heretofore relied upon aqueous or liquid electrolytes to provide ionic conductivity between the electrodes thereof. Unfortunately, aqueous liquid electrolytes have problems associated with sealing, packaging, and electrolyte leakage, all of which are well known in the industry. Solid polymer electrolytes were developed by numerous different companies in an effort to address the problems associated with liquid aqueous electrolytes. Each of these different types of solid polymer electrolyte systems have met with varying degrees of success, typically owing to the fact that ionic conductivity is generally not as good as that found in a liquid aqueous system. Solid polymer electrolytes alleviate the problems experienced with respect to packaging and electrolyte leakage. In addition, polymer electrolytes have the advantage of being able to be formed into thin films to improve the energy density, and to act as an electrode spacer in order to eliminate an inert separator used in the prior art.

One polymer electrolyte system which has received considerable interest particularly in electrochemical capacitor applications, is polyvinyl alcohol (PVA), having dispersed therein a proton conducting electrolyte active species such as $H_2SO_4$ or $H_3PO_4$. This system is described in, for example, U.S. patent application Ser. No. 08/547,821 to Lian, et al, filed Oct. 25, 1995. Unfortunately, the PVA/$H_3PO_4$ electrolytes developed heretofore are not completely stable at elevated temperatures. The mechanical strength of thin films of PVA based polymer electrolytes also needs further improvement for eliminating shorts during the assembly process. Further, the frequency response of certain polymer electrolyte based electrochemical capacitor devices is relatively narrow in comparison to dielectric capacitors. This performance differential may be partially improved by developing polymer electrolytes which have higher ionic conductivity.

Most polymer electrolyte systems have heretofore been fabricated principally from polymer films. Films have the advantage of being relatively easy to handle, as well as coming in long, commercially manufactured rolls of material. However, polymer films can be relatively expensive. Further, films present certain problems for making high performance electrochemical devices, such as capacitors or batteries. Free standing film electrolytes may be prone to introducing interfacial effects in electrochemical devices, thus increasing device equivalent series resistance (ESR). Additionally, capacitors and batteries sometimes need to be used in high temperature environments, such as in automotive engine compartments, or in surface mounting on printed circuit boards requiring temperature tolerances of up to 250° C. Most polymer electrolytes cannot withstand such high temperatures. This is due to the fact that most polymers include substantial portions of water. Accordingly, when temperatures exceed 100° C., the water is vaporized causing delamination of the device into which the electrolyte layer is incorporated.

Accordingly, there exists a need to provide novel electrochemical devices incorporating electrolyte materials free from the limitations inherent in the prior art. Such electrolyte materials should be characterized by being substantially free from moisture, and hence capable of withstanding elevated temperatures. Further, such a material should be easily manufactured and economical for use in consumer electrochemical devices. Finally, fabrication of such an electrolyte layer should be relatively simple, inexpensive and readily repeatable.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Figure 1:
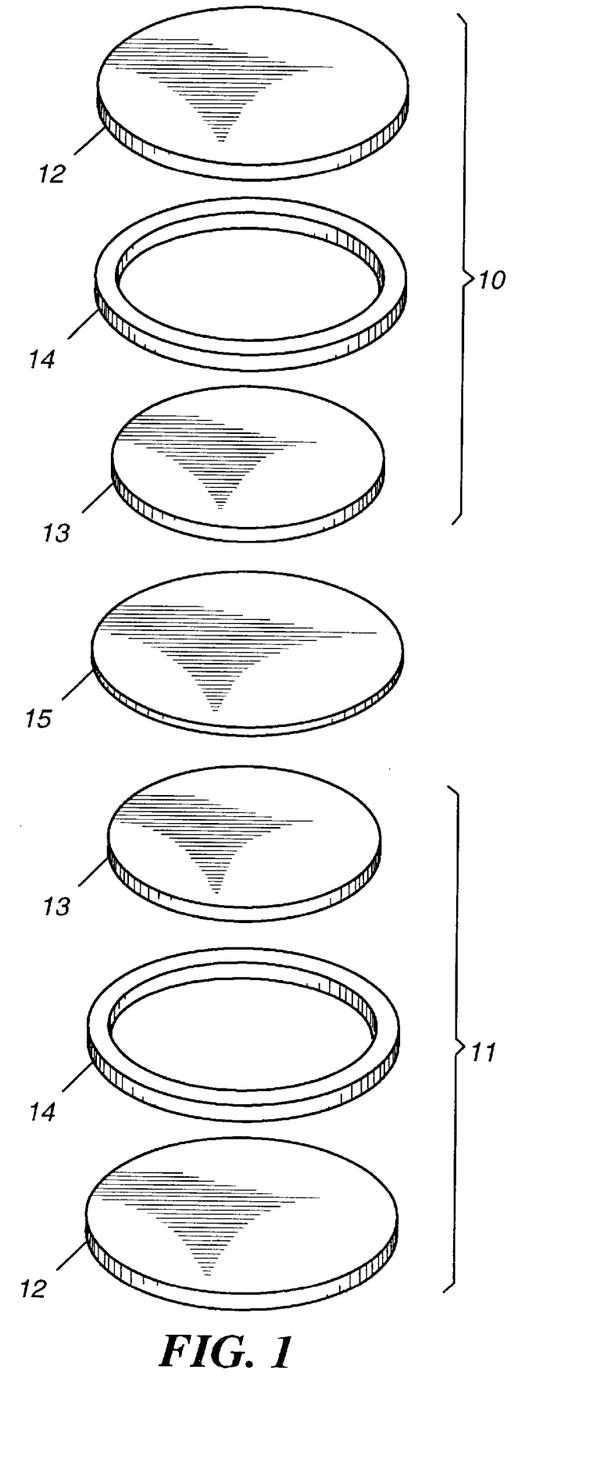
FIG. 1 is a schematic representation of an electrochemical charge storage device in accordance with the instant invention.

Referring now to FIG. 1, there is illustrated therein an energy storage device such as an electrochemical charge storage device fabricated from a pair of electrode assemblies 10 and 11, which may be the anode and the cathode of the device. The electrochemical charge storage device may be an electrochemical capacitor or an electrochemical battery cell. The electrochemical capacitor is preferably an electrochemical capacitor characterized by an oxidation/reduction charge storage mechanism. Each electrode assembly 10 and 11 includes an electrode 13 which electrodes may either be fabricated from the same or different materials. In the instance in which the electrodes are fabricated of the same material, they are referred to as "symmetric electrodes". Conversely, if they are made from different materials, they are referred to as "asymmetric electrodes". Regardless of whether or not the electrodes are asymmetric or symmetric, they may be each made from one or more materials selected from the group consisting of ruthenium, iridium, platinum, cobalt, tungsten, vanadium, iron, nickel, molybdenum, silver, zinc, lead, manganese, alloys thereof, nitrides thereof, carbides thereof, sulfides thereof, oxides thereof, and combinations thereof. Alternatively, said electrodes may be fabricated of conducting polymers.

Each electrode assembly may further include a current collector 12 which is electrically conducting. The current collector 12 is preferably chemically inert in the polymer electrolyte 15 described hereinbelow. A housing or gasket 14 may be employed to house the electrode and the electrolyte, but is optional. The electrolyte 15 is sandwiched between the electrodes and is in the form of a film, such as a polymer, which may also serve as a separator between the two electrodes. This structure thus affords free and unobstructed movement to the ions in the electrolyte. The combination electrolyte/separator prevents contact between the opposing electrodes since such a condition would result in a short circuit and malfunction of the electrochemical cell.

Figure 2:
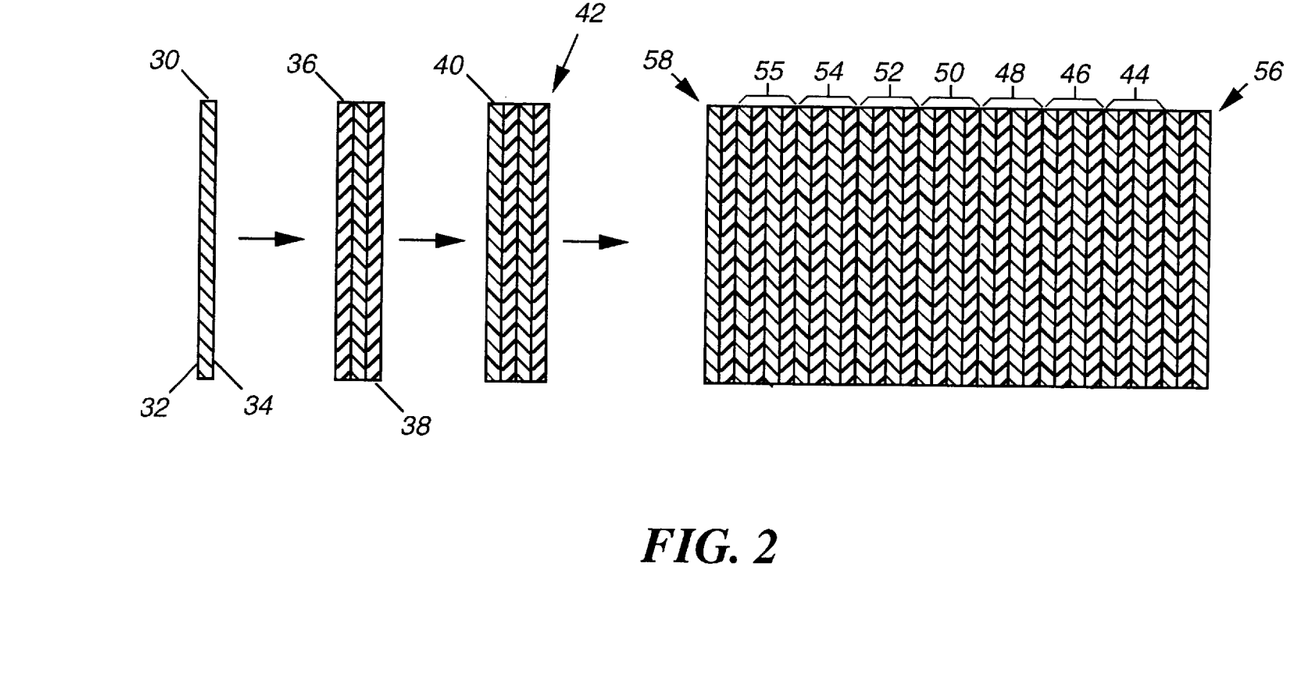
FIG. 2 is a schematic representation of a second electrochemical charge storage device in accordance with the instant invention.

Referring now to FIG. 2, there is illustrated therein a second electrochemical device, such as an electrochemical capacitor, which may be adapted to employ an electrolyte material such as that disclosed hereinbelow. The device of FIG. 2 is a bipolar electrochemical capacitor device which includes a first layer 30 which is a bipolar metal substrate or foil. The bipolar metal foil is fabricated to be both the substrate upon which active electrode materials are deposited, as well as a current collector for the charge generated by the materials. Accordingly, layer 30 may be fabricated of a number of different materials selected from the group consisting of carbon, aluminum, titanium, copper, nickel, brass, stainless steel, silver, titanium/tantalum alloys, alloys thereof, and combinations thereof. Layer 30 includes first and second major surfaces 32 and 34 upon which are deposited layers of electrode active material 36 and 38. The electrode active materials may be fabricated of symmetric or asymmetric materials such as those described hereinabove with respect to FIG. 1.

Disposed upon at least one of said electrodes is a layer of an electrolyte material 40 in accordance with the instant invention. The electrolyte material 40 as illustrated in FIG. 2 is disposed upon electrode layer 36. As maybe appreciated from FIG. 2, a completed single cell bipolar device 42 comprises a bipolar metal foil, with electrodes disposed on either side of said foil and a layer of electrolyte material disposed on at least one of said electrodes. Incorporated into a multicell device, a plurality of such single cells may be arranged in stacked configuration. Accordingly, seven such devices, 44, 46, 48, 50, 52, 54, and 55 may be arranged in stacked configuration in order to increase the voltage output therefrom. It is to be understood that the number of cells arranged in stacked configuration may be varied. Disposed adjacent the outer most cells 44 and 55 are end plates 56 and 58 adapted to collect current generated by the stacked cells. It is to be understood that while the devices illustrated with respect to FIGS. 1 and 2 are electrochemical capacitors, the invention is not so limited. Indeed, the electrolyte material described hereinbelow, may be readily adapted for use in capacitors, electrochemical battery cells, fuel cells, electrochemical sensors, and any other type of electrochemical cell requiring an electrolyte material for providing ionic conductivity.

The electrolyte materials described herein may be fabricated by providing a powdered polymeric precursor material characterized by either a melting temperature or heat deflection temperature or a glass transition temperature in excess of at least 100° C. The powdered polymeric precursor material is preferably a powdered linear polymeric precursor material. Examples of such material include, but are not limited to, poly(benzimidazole) (PBI), poly(ethyleneoxide) (PEO), poly(acrylamide) (PAAM), poly(vinylpyrrolidone) (PVP), poly(vinylpyridine) ($P_2VP$), poly(ethyleneimine) (PEI), poly(acrylic acid) (PAA), poly(aminosilicates) (PAS) and combinations thereof. In one preferred embodiment, the powdered polymeric precursor material is PBI.

The powdered polymeric precursor material is then mixed with an acidic electrolyte active species which likewise has a boiling point of greater than 100° C. The acidic electrolyte active species is provided to protonate the polymeric precursor material thus imparting the characteristic of high ionic conductivity. The electrolyte active species is preferably an acidic electrolyte active species, and is preferably an acid selected from the group consisting of $H_3PO_4$, $H_2SO_4$, HCL, $HClO_4$, HNO3, and combinations thereof.

The electrolyte active species and the powdered polymeric precursor material are mixed together and heated to temperatures in excess of at least 100° C. The heating provides several useful functions including, expanding substantially the free volume of the polymeric precursor material thus allowing more of the electrolyte active species to react with sites in the polymeric precursor material. Moreover, heating to temperatures in excess of 100° serves the additional beneficial function of vaporizing liquid water which may be present in the system. Accordingly, by driving off moisture, the electrolyte material resulting from the process described herein may be employed in high temperature environments without experiencing the shortcomings and limitations characteristic of the prior art.

Figure 3:
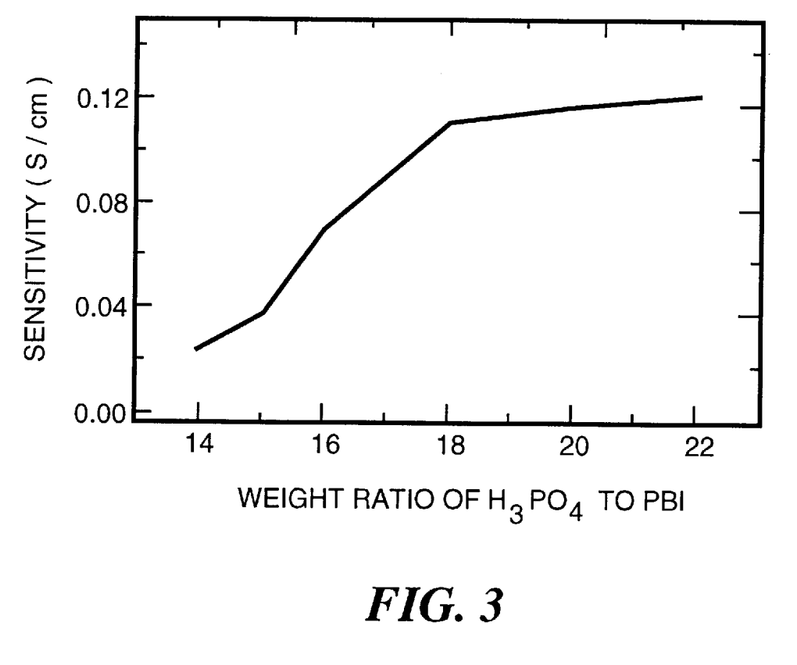
FIG. 3 is a chart illustrating the conductivity versus the ratio of electrolyte active species to polymer precursor material for an electrolyte system in accordance with the instant invention.

The electrolyte active species and the powdered polymeric precursor material may be mixed in varying ratios of one to the other. In one embodiment, the ratio of the electrolyte active species to the powdered polymeric material is in the range of between 2:1 and 40:1 and preferably between 5:1 and 30:1. A summary of the effect of varying the weight ratio of acidic electrolyte active species to powdered polymeric material may be appreciated from a perusal of FIG. 3 and Table 1 below. As may be appreciated, conductivity climbs until approximately 0.13 Siemens per centimeter (S/cm) at a ratio of 30:1 acid to polymer.

TABLE I

Physical Properties of "Butter" electrolytes

| H3PO4:PBI weight ratio | electric conductivity (S/cm) | relative viscosity (kcP) |
|---|---|---|
| 12:1 | 0.018 | 176 |

TABLE I-continued

Physical Properties of "Butter" electrolytes

| H3PO4:PBI weight ratio | electric conductivity (S/cm) | relative viscosity (kcP) |
|---|---|---|
| 16:1 | 0.07 | 30 |
| 18:1 | 0.11 | 11 |
| 22:1 | 0.121 | 6.3 |
| 25:1 | 0.126 | 3.9 |
| 30:1 | 0.134 | 1.6 |

In one preferred embodiment, the powdered polymeric material is a linear powdered polymeric material known as PBI, and is mixed with $H_3PO_4$, as the electrolyte active species. The mixture is then heated to temperatures of approximately 190–195° C. in order to drive off moisture as well as to insure adequate interaction between the $H_3PO_4$ and the PBI. This yields an electrolyte material which has conductivities approaching those of the acidic electrolyte in liquid form alone, as well as allowing the material to be used in high temperature environments, as described above. Moreover, the resulting materials are an extremely viscous, uniform one-phase "solution". The ultimate viscosity of the electrolyte material depends on the amount of the acid electrolyte active species incorporated therein as disclosed hereinabove in connection with Table I. The less the concentration of the electrolyte active species, the higher the viscosity of the final product. The viscosity of the material is also an advantage from the standpoint of device fabrication in that the electrode material may be applied on electrode surfaces by painting, screen printing, doctor-blading, stencil printing, rollercoating, transfer pad printing, rotogravure, flexographics, lithographics, and any number of other techniques well known in the art.

With respect to the powdered polymeric precursor material, the resulting electrolyte material properties and characteristics are independent of the initial particle sizes of the powders. Accordingly, use of inexpensive regular grade powders to make the final electrolyte material is possible, thus reducing costs.

PBI films as used in the prior art have very limited free volume for acid doping and doping takes at least eight to ten hours to demonstrate a conductivity having satisfactory results. Linear PBI molecules from the powders are stretched at high temperatures. The free volume of the electrolyte for the doped acid can thus be controlled by the amount of the acid. The electrolyte material thus may have higher conductivity than that of acid doped polymer film electrolytes of the prior art. Moreover, since the electrolyte material is treated at temperatures in excess of 190° C., there is no moisture content in the electrolyte material. These enhanced characteristics are believed to be the result of the polymer doping reaction occurring upon disentanglement of linear polymer with heating as described hereinabove. Disintanglement creates more free volume for more acid incorporation sites with the polymers. Accordingly, numerous other polymeric materials maybe used as the starting material in the electrolyte.

The invention may be better understood from a perusal of the examples which follow hereinbelow.

Examples

Preparation

Electrodes used in the following examples were made from ruthenium oxides deposited on titanium substrates or carbon deposited on aluminum substrates. Layers of the electrolyte material were coated on the electrodes.

An electrolyte material was fabricated by placing 5 g of powdered PBI in a container and mixed with 94 g of 85% $H_3PO_4$. The mixture had a ratio of 16:1, acid to polymer. The mixture was then heated to a temperature of 194° C. for a period of 1 hour. The resulting electrolyte material had a highly viscous character on the order of 30 kcp, and demonstrated a conductivity on the order of 0.07 S/cm.

Thereafter, a device was fabricated by providing a first electrode comprising ruthenium deposited on a titanium foil substrate, and carbon on an aluminum foil substrate as a second electrode. Each electrode surface was coated with a layer of the electrolyte material deposited to a thickness of approximately 3 mils.

In order to make single cell devices, each single sided electrode was coated with the electrolyte material and then two similar devices were overlapped. In the fabrication of multi-cell devices, both sides of bipolar electrodes were coated with the electrolyte materials. These electrolyte coated materials were laminated to make stacked bipolar devices, such as that described hereinabove with respect to FIG. 2.

Example I

Figure 4:
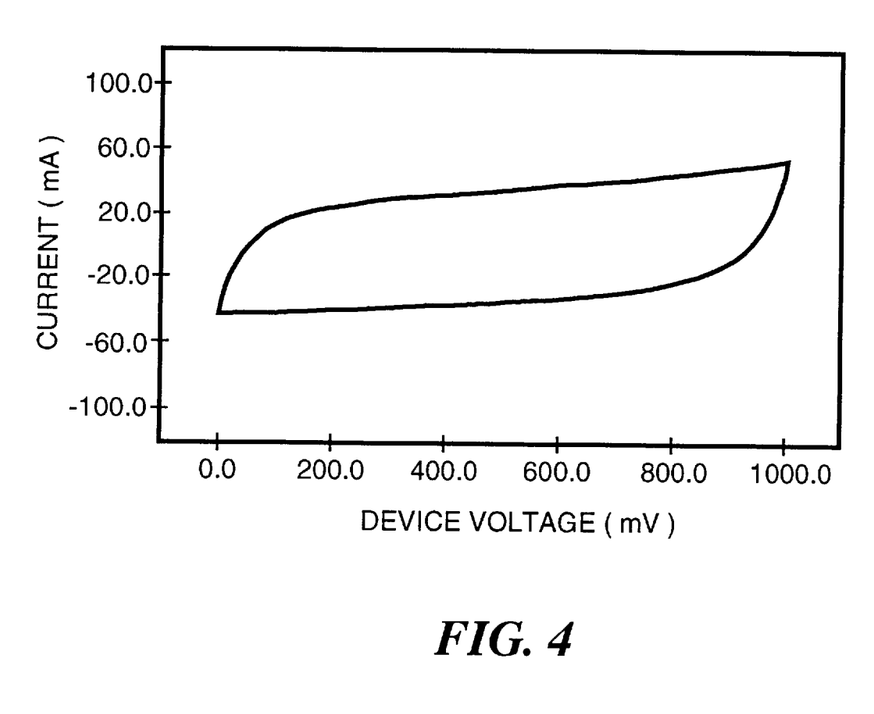
FIG. 4 is a cyclic voltammogram for a single cell ruthenium oxide device incorporating an electrolyte material in accordance with the instant invention.

A single cell device fabricated from a pair of carbon electrodes deposited upon aluminum substrates, with a layer of the PBI/$H_3PO_4$ disposed therebetween was fabricated. The size of the electrodes was 20 square centimeters ($cm^2$). A cyclic voltammogram (CV) was run on this device in order to determine its characteristics. This is shown in FIG. 4. The surface area of the device fabricated was 20 $cm^2$. The capacitance calculated from the CV curve at a scan rate of 50 millivolts (mV)/seconds was 177 millifarads, equivalent to specific capacitance of 18 millifarads per $cm^2$. The measured ESR of this device was 45 milliohms (m$\Omega$). The lower ESR and higher specific capacitance of this device as compared to a standard carbon double layer capacitor indicates that the novel electrolyte material may be coated on a coarse electrode surface without significant interfacial effects. The PBI/$H_3PO_4$ electrolyte based capacitor may thus provide both high energy and power density. This is as compared with standard carbon-based double layer capacitors which typically provide high energy density but not high power density. Additional measurements were taken as to leakage current by providing a constant voltage across the device. The results are shown in Table II below.

TABLE II

Leakage current measured for a butter electrolyte-based single cell carbon capacitor

| Device working voltage (V) | leakage current ($\mu A/cm^2$) |
|---|---|
| 0.5 | 40 |
| 0.75 | 40 |
| 1 | 43 |

Example II

Figure 5:
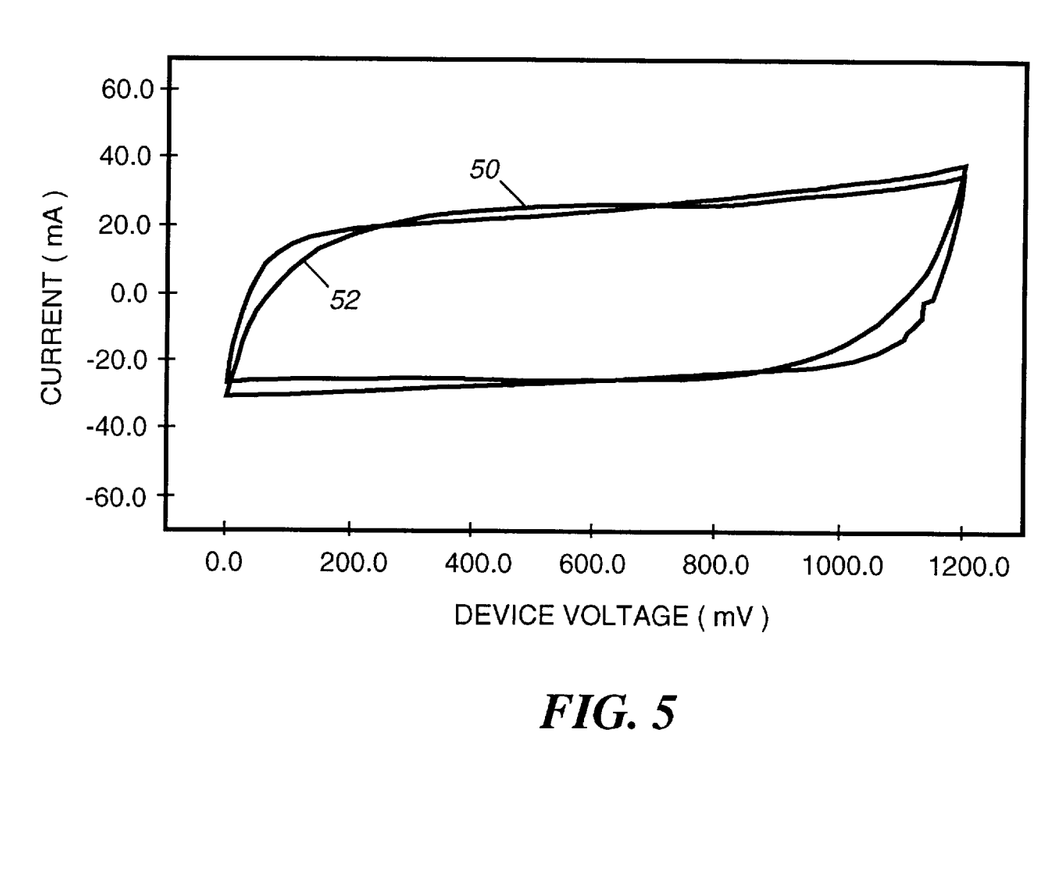
FIG. 5 is a second cyclic voltammogram for the device illustrated in FIG. 4, and compared to a second device including an electrolyte material processed in accordance with the instant invention.

A single cell ruthenium oxide/titanium device was fabricated using two such electrodes with a layer of PBI/$H_3PO_4$ electrolyte material disposed therebetween. Cyclic voltammogram experiments were conducted to characterize device performance and are illustrated in FIG. 5. The capacitance measured was 420 microfarads per $cm^2$ and measured ESR was 185 milliohms per $cm^2$ at room temperature, line 50. The device was then heated to 194° C. in a furnace for twelve minutes. The heat treated device was cooled down to room temperature and tested again. The result is shown by line 52 of FIG. 5. The capacitance and ESR were 465 millifarads per cm² and 193 milliohms per cm² respectively. The increased capacity is believed to be due to the electrolyte penetration in the porous electrode during the heating process. Tests of ESR indicated that it did not change significantly. These results indicate that a device fabricated with the electrolyte disclosed herein could be used in high temperature processes such as reflow soldering processes, conventionally used with printed circuit boards.

Example III

Figure 6:
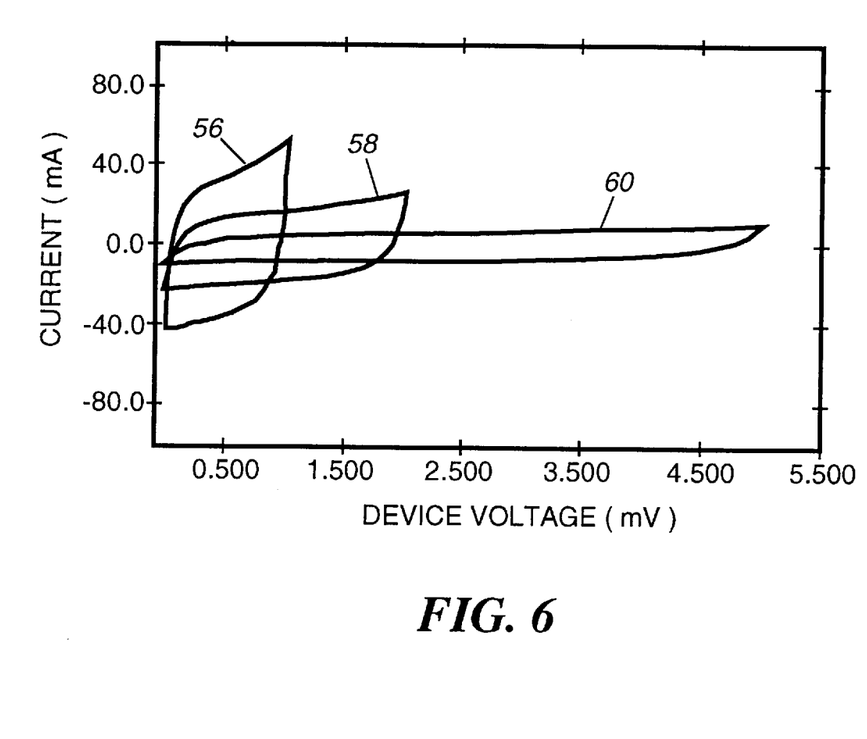
FIG. 6 is a cyclic voltammogram for single cell, double cell, and five-cell devices, each fabricated with an electrolyte material in accordance with the instant invention.

Five discrete carbon double-layered capacitors such as those described hereinabove with respect to FIG. 1 where arranged in stacked configuration using the PBI/H$_3$PO$_4$ electrolyte material of the instant invention. Cyclic voltammogram experiments were run and are illustrated in FIG. 6. Capacitance calculated from the cyclic voltammogram for the five cell device, line 60, was 25 millifarads, and the ESR measured was 260 microohms. CV experiments carried out on 1, 2 and 5 cell devices, lines 56, 58, and 60 respectively, was 1, 2, and 5 volts respectively, as is illustrated in FIG. 6. Device ESR was much better that typically observed for carbon based double-layer capacitors.

Example IV

Figure 7:
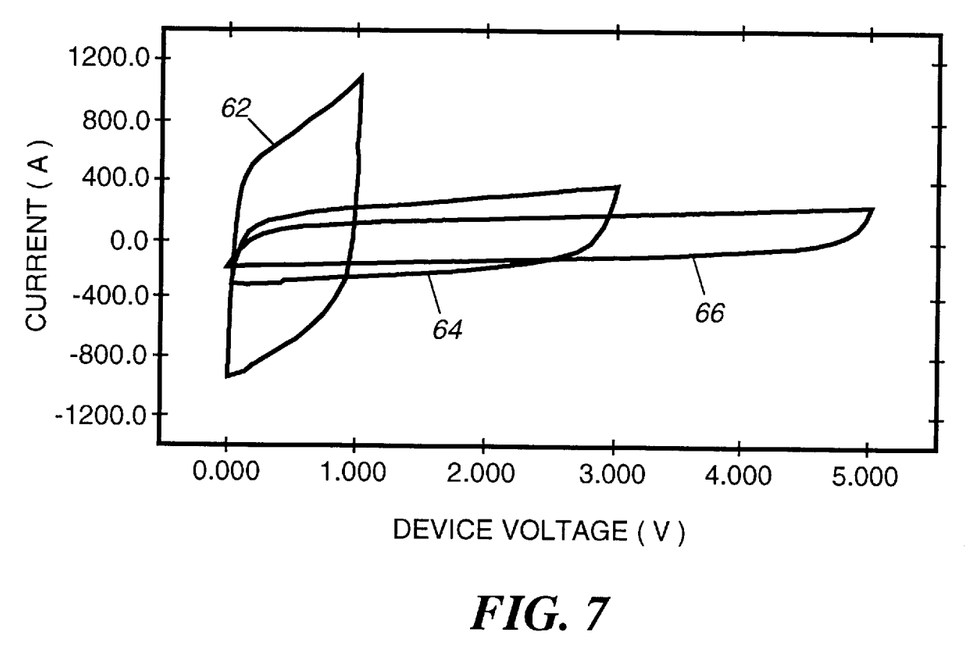
FIG. 7 is a series of cyclic voltammogram curves for one cell, three-cell, and five-cell electrochemical devices incorporating an electrolyte material in accordance with the instant invention.

One, two, and five cell ruthenium/titanium capacitors were made with PBI/H$_3$PO$_4$ electrolyte as described hereinabove. Referring to FIG. 7, there is illustrated therein the cyclic voltammogram curves, 62, 64 and 66 for devices described above respectively. The one, three, and five-cell devices had working potential windows of 1, 2, and 5 volts respectively. For the five-cell device, the capacitance measured was 120 millifarads with an ESR measured to be approximately 42 milliohms.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of making an electrolyte material for an electrochemical cell, aid method comprising the steps of:

providing a powdered polymeric precursor material characterized by a melting temperature of greater than 100° C.;

mixing said powdered polymeric precursor material with operative amounts of an electrolyte active species having a boiling point of greater than 100° C.; and heating said powdered polymeric precursor and said electrolyte active species to temperatures of greater than 100° C. but generally less than the boiling temperature of said electrolyte active species.

2. A method as in claim 1, including the further step of selecting the powdered polymeric precursor material from the group consisting of poly(benzimidazole), poly(ethyleneoxide), poly(acrylamide), poly(vinylpyrrolidone), poly(vinylpyridine), poly(ethyleneimine), and combinations thereof.

3. A method as in claim 1, wherein said electrolyte active species is selected from the group consisting of H$_2$SO$_4$, H$_3$PO$_4$, HCl, HClO$_4$, HNO$_3$, and combinations thereof.

4. A method as in claim 1, wherein the ratio of electrolyte active species to polymer is between 2:1 and 40:1 by weight.

5. A method as in claim 1, wherein the ratio of electrolyte active species to polymer is between 5:1 and 30:1 by weight.

6. A method of fabricating an electrolyte material for an electrochemical cell comprising the steps of providing a powdered linear polymer precursor material;

expanding the free volume of said polymer precursor material; and protonating said polymer precursor via exposure to an acidic electrolyte active species.

7. A method as in claim 6, wherein said polymer is selected from the group consisting of poly(benzimidazole), poly(ethyleneoxide), poly(acrylamide), poly(vinylpyrrolidone), poly(vinylpyridine), poly(ethyleneimine), and combinations thereof.

8. A method as in claim 6, wherein said electrolyte active species is selected from the group consisting of H$_2$SO$_4$, H$_3$PO$_4$, HCl, HClO$_4$, HNO$_3$, and combinations thereof.

9. A method as in claim 6, wherein the ratio of electrolyte active species to polymer is between 2:1 and 40:1 by weight.

10. A method as in claim 6, wherein the ratio of electrolyte active species to polymer is between 5:1 and 30:1 by weight.

11. A method of fabricating an electrolyte material for an electrochemical cell comprising the steps of mixing powdered poly(benzimidazole) with H$_3$PO$_4$ at temperatures in excess of 100° C., and in a ratio H$_3$PO$_4$ to poly(benzimidazole of between 5:1 and 30:1 by weight.

* * * * *